Jan. 12, 1926.
A. D. VARELL
1,569,341
STAKE
Filed Oct. 28, 1922
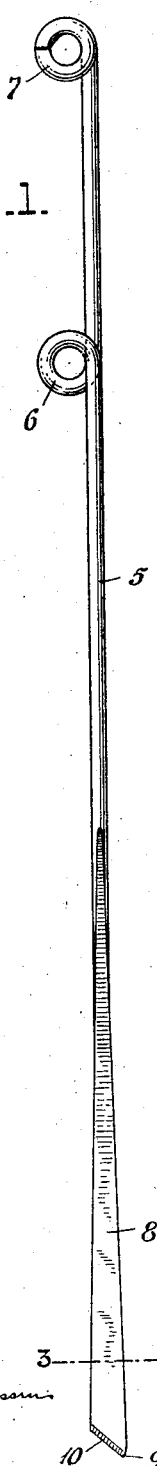
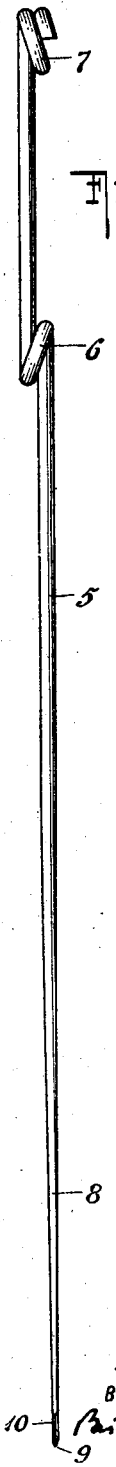
INVENTOR
ANNA D. VARELL Patented Jan. 12, 1926.

1,569,341

UNITED STATES PATENT OFFICE.

ANNA D. VARELL, OF NEW YORK, N. Y.

STAKE.

Application filed October 28, 1922. Serial No. 597,440.

*To all whom it may concern:*

Be it known that I, ANNA D. VARELL, a citizen of Argentina, and resident of the borough of Manhattan, city, county, and State of New York, have invented certain new and useful Improvements in Stakes, of which the following is a specification.

My invention relates to stakes and more particularly to garden stakes, and has for its object to provide an improved stake for roping off a flower bed, section of lawn and the like and which may be easily driven into the ground and is firmly fixed therein by reason of its construction. Other more specific objects of the invention will appear from the description hereinafter and the features of novelty will be pointed out in the appended claim.

In the accompanying drawing, which illustrates an example of the invention without defining its limits, Figs. 1 and 2 are elevations of the stake looking in directions at right angles to each other, and Fig. 3 is a section on line 3—3 of Fig. 1.

The stake in its preferred construction comprises a continuous rod 5 of metal bent at an intermediate point and at one end into the form of eyelets 6 and 7 respectively; the rod 5 is so bent at the points where the eyelets are located that the latter lie in a common plane in alignment with each other as shown in Fig. 2. At the end which is driven into the ground the stake is formed with a diverging and flattened section 8, the free end of which is inclined across the major axis of the rod 5 to form an entering point 9 and a cutting edge 10, the latter being preferably provided with a double bevel to increase its cutting action.

In utilizing the stake, the required number thereof are driven into the ground at spaced intervals about the area which is to be roped off after which wires, cords or ropes are threaded through the eyelets 6 and 7 to rope off the predetermined space whatever it may be. Because of the entering point 9 the entrance of the stake into the ground is facilitated; at the same time said point provides a medium whereby the position of the stake may be accurately predetermined. As the stake passes into the ground, the edge 10 cuts therethrough and because of its double bevel, forces the earth in opposite directions, or spreads it, and thus progressively removes opposition to the forcing in of the stake. This is in contradistinction to the most common form of stake, which even though it may be pointed to a certain extent, packs the earth in front of the point in a cushion of gradually increasing resisting force so that, after a time, further progress of said stake into the ground is arrested or accomplished only with great difficulty. At the same time the ground, by being forced in opposite directions, is firmly packed for engagement with the major surfaces of the flattened section 8 whereby the stake is firmly fixed in the ground against wabbling; that is to say, the opposite flat surfaces of the section 8 in co-operation with the packed earth resulting from the action of the double-bevelled edge 10, automatically fix the stake as it is driven into the ground and do away with the necessity for any subsequent packing of the earth about said stake. It will furthermore be noted that the eyelets 6 and 7 are bent in directions parallel to the major surfaces of said section 8 and that, accordingly, the wires, cords or ropes threaded through said eyelets extend transversely to said surfaces or approximately so; with this arrangement, if a force tending to disturb the stakes is exerted thereon by said wires, cords or ropes, a maximum resistance to this force is interposed by the action of said flattened section 8.

The stake is of simple construction and ornamental appearance and may be produced at a minimum cost; by reason of the ease with which said stakes may be forced into the ground, either by being simply pushed into the same or by being driven therein by means of a hammer or the like, they provide an ideal stake for use in the garden to stake out sections thereof for any purpose. By making the eyelet 7 in the form of a double loop it provides a cushion for the hand whereby pushing of the stake into the ground is facilitated and the use of a hammer or other tool is made unnecessary.

The removal of the stake from the ground does not tear up the lawn and leaves practically no visible evidence of its previous location in the ground. The stake provides an ideal support for wreaths and the like, for instance upon a grave, the eyelet 7 being used for suspending the wreath while, by passing a cord or the like therethrough, the eyelet 6 may serve to prevent swinging of said wreath.

Various changes in the specific form shown and described may be made within the scope of the claim without departing from the spirit of the invention.

I claim:

A stake comprising a rod bent at one end and at an intermediate point into eyelets lying in a common plane and in line with each other, a flattened diverging section at the other end of said rod, the planes of the major surfaces of said section being transverse to the axes of said eyelets, a double bevelled cutting edge at the free end of said section diagonal to the major axis of the stake and conterminous to the width of said flattened section at said free end and forming an entering point.

In testimony whereof I have hereunto set my hand.

ANNA D. VARELL.